United States Patent Office.

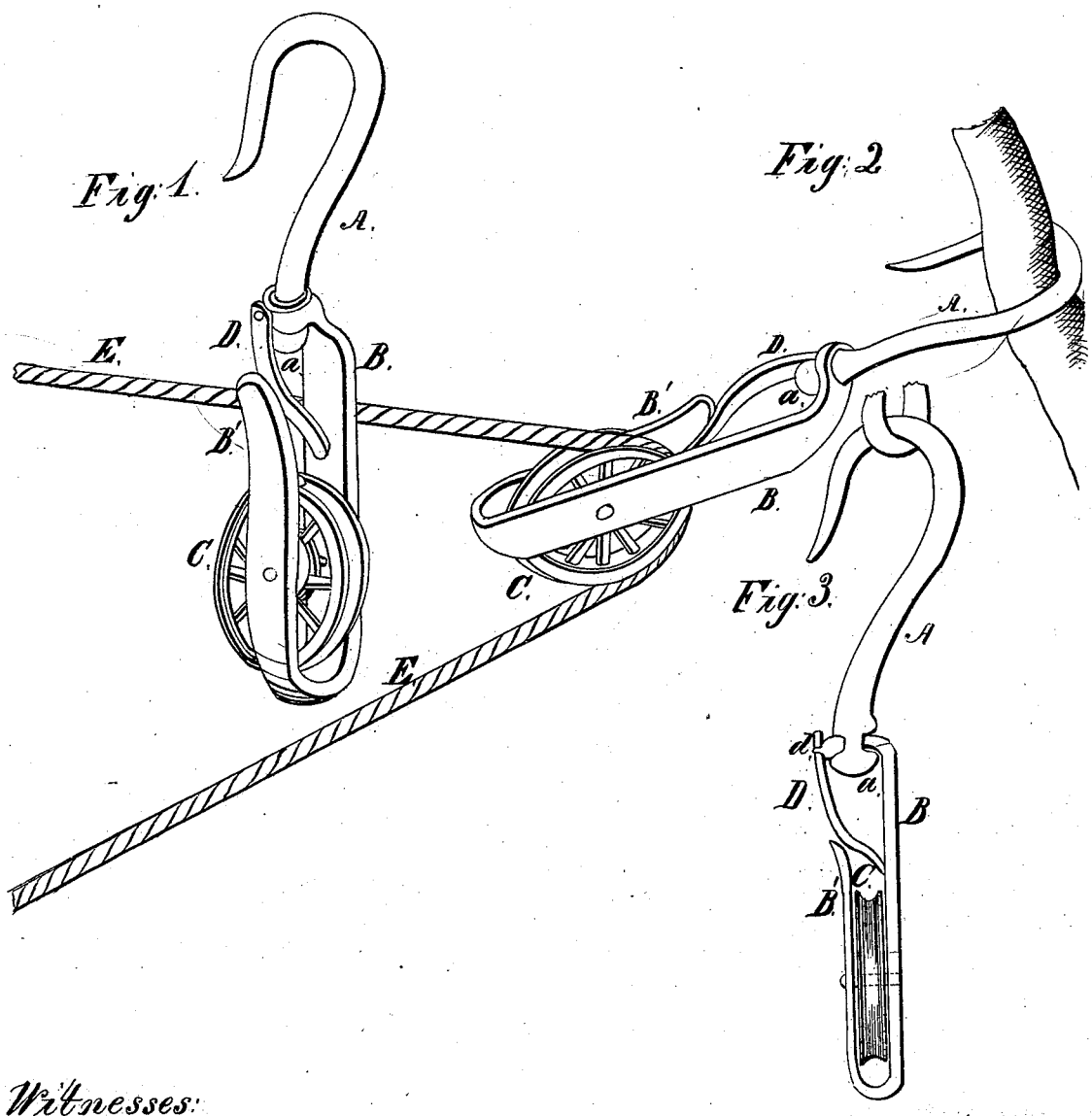

RUDOLPH WHITE, OF NEWPORT, PENNSYLVANIA

Letters Patent No. 82,911, dated October 6, 1868.

IMPROVED CLOTHES-LINE ADJUSTER.

The Schedule referred to in these Letters Patent and making part of the same.

TO ALL WHOM IT MAY CONCERN:

Be it known that I, RUDOLPH WHITE, of Newport, Perry county, in the State of Pennsylvania, have invented a Self-Adjusting or Angulating Device for changing the Direction of Clothes-Lines; and I do hereby declare that the following is a full and exact description thereof, reference being had to the accompanying drawings, making a part of this specification, in which—

Figure 1 is a perspective view of the combined arrangement of the parts.

Figure 2 the application of the same.

Figure 3 a plan view of the same, applied to a staple.

The nature of my invention consists in providing a hook with a swivel-joint, in connection with a spring and pulley, in order that the latter can accommodate itself to any angle, in whatever direction the cord or clothes-line may be carried for attachment, from one point to another, without twisting the same or cause it to bind on the grooved pulley and its bearings.

The drawings and object stated clearly define my invention, so as to enable any one skilled in the business or art to make and use my invention.

Fig. 3 shows the hook A, with its neck and head, a, confined in the top of the bearings B B' of the pulley C; a pin, d, for a spring, D, is also shown. The pulley, with its spring and bearings, turns freely upon the head, a, of the swivel-hook A, so that when the clothes-line is slipped in between the spring and the open bearing, B', it cannot escape by simply slacking the rope, as may happen, but confines the cord to the groove of the pulley, but so as to allow the cord to be easily disengaged, when desired.

I am aware that if we consider the parts separately, there is no novelty in the swivel-hook and pulley with its bearings; I am also aware that Patent No. 67,341 claims a clothes-line hook-block, the shell of which is provided with an aperture and loop, and made in one continuous piece of iron or other metal. This has a pulley, but no swivel-hook; simply a loop to connect the same with a hook, nail, or button affixed to some object. Such a device I do not claim.

By the combination of my device I can attach it to a limb of a tree or any convenient object and run my clothes-line out at any angle, in any direction. The swivel-hook allows the rope and pulley to accommodate their united action with the greatest facility; in short, presenting so many advantages as to make my device substantially differ from that above referred to.

What I claim as my invention, and desire to secure by Letters Patent, is—

The arrangement of the spring D, in combination with the swivel-hook A, and bearings B B', in the manner and for the purpose set forth.

R. WHITE.

Witnesses:
WM. B. WILEY,
JACOB STAUFFER.